G. C. HOWARD.
PROCESS FOR MAKING SULPHUR FROM SULPHUR DIOXIDE.
APPLICATION FILED SEPT. 9, 1918. RENEWED NOV. 28, 1921.
1,417,068.
Patented May 23, 1922.
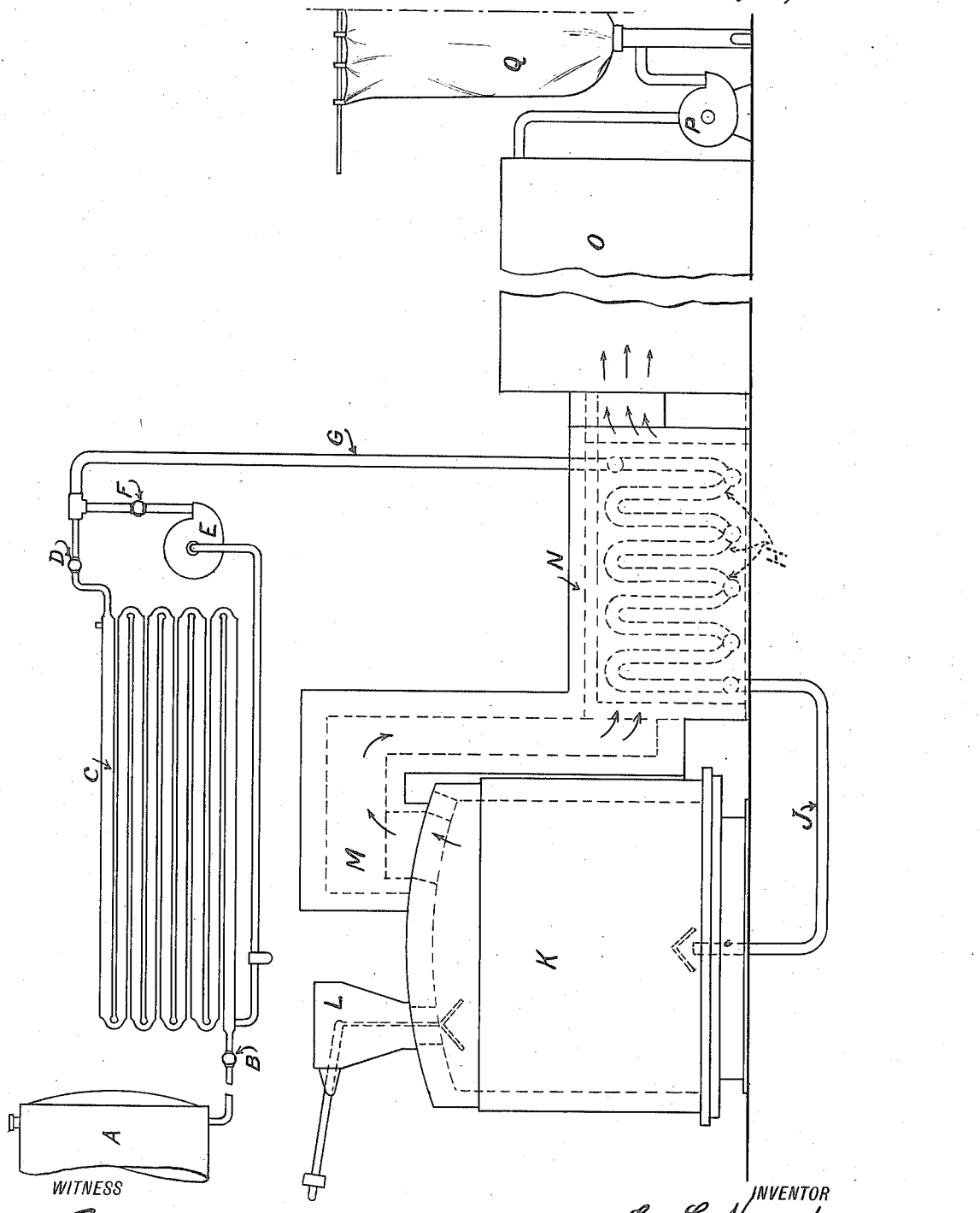

UNITED STATES PATENT OFFICE.

GUY C. HOWARD, OF TACOMA, WASHINGTON, ASSIGNOR TO THE AMERICAN SMELTING & REFINING CO., A CORPORATION OF NEW JERSEY.

PROCESS FOR MAKING SULPHUR FROM SULPHUR DIOXIDE.

1,417,068.  Specification of Letters Patent.  Patented May 23, 1922.

Application filed September 9, 1918, Serial No. 253,157. Renewed November 28, 1921. Serial No. 518,428.

*To all whom it may concern:*

Be it known that I, GUY C. HOWARD, a citizen of the United States, and resident of Tacoma, in the county of Pierce and State of Washington, have invented certain new and useful Improvements in Processes for Making Sulphur from Sulphur Dioxide, of which the following is a specification.

The invention relates in general to a process for recovering sulphur from sulphur dioxide gas and specifically relates to a process for recovering sulphur from metallurgical gases containing sulphur dioxide.

The invention contemplates an improvement in the known process of subjecting sulphur dioxide gas to the reducing action of incandescent coke or similar reducing agent.

The primary object of the invention is to provide a simple process for producing sulphur in large quantities economically on a commercial scale.

Incidental to this general object it is among other desideratum to maintain such conditions as will eliminate secondary reactions detrimental to the process and to carry out the process with a view to adapting it to establish metallurgical conditions so that it may be operated with such economy to sustain commercial life.

One approved process for carrying the object of the invention consists in:—

1. Cooling and removing the flue dust and metallic fumes from the metallurgical gases.

2. Absorbing the sulphur dioxide in water or other suitable solvent thereby separating it from other gaseous constituents.

3. Driving off the sulphur dioxide and some water vapor from the absorption liquor by heating it practically to boiling temperature.

4. Cooling the sulphur dioxide gas to remove part of the water vapor and then passing it through concentrated sulphuric acid or by other suitable means to completely de-hydrate the sulphur dioxide gas.

5. Liquefying the sulphur dioxide gas by subjecting it to pressure and refrigeration.

6. Storing the liquefied sulphur dioxide in a suitable tank or container.

7. Feeding the liquid sulphur dioxide to expansion coils in which it is volatilized as a sulphur dioxide gas of 100% purity and free from moisture.

8. Mixing this pure dry sulphur dioxide with a regulated amount of atmospheric air which may or may not be de-hydrated depending on its realtive humidity.

9. Passing this mixture through a suitable equipment whereby it is preheated to a certain extent by the hot exit gases from the reduction furnace next referred to.

10. Passing this heated gas mixture into a reduction furnace containing incandescent coke or equivalent and in which the sulphur dioxide is reduced to sulphur by contact with the incandescent coke.

11. Causing the exit gases of the furnace to pass through the above preheater whereby their heat is largely transferred to the incoming gas mixture.

12. Thence passing the cooled exit gases through a settling chamber in which the sulphur is collected in part and finally passing through bags or other filtering device to recover the balance of the sulphur.

For the purpose of illustrating a plant for carrying out some of the steps of the above outlined process, reference is made to the accompanying drawings which show, diagrammatically, a new arrangement of conventional apparatus.

It is to be understood that the first five steps hereinbefore outlined can be performed with the usual apparatus now in general use and that the concentrated, de-hydrated and liquefied sulphur dioxide is admitted to a storage tank A. The liquefied sulphur dioxide is discharged therefrom to a set of expansion coils C through a controlling expansion valve B. The coils are of the usual double pipe expansion coil sets common in ammonia refrigerating plants and discharge the vaporized sulphur dioxide through the controlling valve D into the main G. A pressure fan E draws air, which may or may not have been previously de-hydrated depending upon its relative humidity, and discharges the same into the main G in advance of the valve D.

This air may be de-hydrated either by scrubbing with concentrated sulphuric acid as is usual or by connecting the suction pipe of the fan to the expansion coil C whereby the air supplied to the fan is drawn through at least one pipe chamber of the double pipe coil. This utilization of the expansion coil serves the double purpose of supplying heat to the expansion coil to compensate for the latent heat of evaporation of the liquid sulphur dioxide and also supplies a refrigerant to the air supplied to the fan E. By either of these means the moisture contents of the air is reduced to a minimum. A valve F in the discharge line of the fan provides a means for regulating the volume of air delivered by the fan into the main G. The sulphur dioxide from the coil C and the air from the fan E are mixed in any desired proportion by means of the regulating valves B, D and F.

Main G leads the gas mixture through a coil of preheating pipes H shown in broken lines located in a preheater chamber N. The gases slightly heated in their passage through the pipes H are lead hence through a main J to the interior of a reduction furnace K. This furnace is preferably a furnace of a gas producer type, with a hopper L for feeding coke thereto and with an exit flue M leading to the preheater N. The furnace K contains an incandescent coke bed through which the sulphur dioxide and air mixture from the main J passes and in which the sulphur dioxide is reduced to elemental sulphur. The free oxygen of the air within the furnace combines with the carbon present to supply an increment of heat necessary to sustain suitable furnace temperature to give complete re-action. The exit gases from the furnace contain essentially, pure sulphur vapor, carbon dioxide and nitrogen. These gases pass through the preheater chamber N wherein their heat is largely transferred to the incoming gas mixture carried in pipes H. From chamber N the cooled exit gases pass to the settling chamber O wherein the sulphur largely settles out. A fan P connected to the chamber O draws the gases therefrom and delivers it to a bag or other filtering device Q in which the remainder of the sulphur is recovered. The gaseous constituents of the exit gases escape through the bag into the air or into other gas handling apparatus.

In operation, and assuming that there is pure liquefied sulphur dioxide in the tank A, a coke fire is started in furnace K and built up by admitting air from fan E until a suitable zone of incandescent coke is established in the furnace. The air supply is then reduced by partially shutting off valve F and at the same time valves B and D are opened and regulated so that sulphur dioxide gas and air enter main G in a predetermined ratio. Fan P is actively disposed and maintains a desired draft through the furnace and subsequent equipment sufficient to carry off the exit gases from the furnace.

The reaction between sulphur dioxide and the incandescent coke depends primarily on the temperature of the incandescent coke zone and on the time of contact of the gases inside the furnace. By actual operation it is found that the temperature inside the furnace can be entirely controlled by manipulation of the proportion of sulphur dioxide and air going to the furnace. This proportion is adjustable by means of the valves B, D and F. If the temperature gets unnecessarily high, it can be reduced and if it gets too low for complete reaction it can be increased by suitably adjusting the valves.

The time of contact of the gases is determined by the volume of sulphur dioxide air mixture fed to the furnace and by the volume of the incandescent coke zone present in the furnace.

Coke is fed to the furnace as needed and the ashes removed either periodically or continuously. The sulphur produced is removed from the preheater N, from the chamber O and from the bag Q, either continuously or periodically by suitable means. As carried out in this manner the process is continous and under complete control.

By means of a process such as is herein outlined the moisture contents in the gases going to the reduction furnace is held to a minimum which condition facilitates temperature control of the furnace and prevents secondary reaction which would otherwise complicate the process, if the moisture contents of the gases were not so regulated. It is understood that while the step of liquefying the sulphur dioxide gas is not vital to the process, it has the advantage in that it further insures the purity of the resulting sulphur dioxide gas supplied to the reducing furnace and during the step of vaporizing supplies a convenient refrigrating agent to reduce the moisture contents of the atmospheric air in cases where the moisture contents is high.

In the step of subjecting the incoming gases to the heat action of the products of combustion from the reduction furnace, a heat economy is effected. A small increment of heat must be supplied in practice to supplement the heat of reaction of sulphur dioxide and coke in order to sustain the necessary furnace temperature to give complete reaction. This is required because of certain heat losses due to radiation and to heat not recovered from the exit gases.

The simplest method of supplying this additional heat is by burning coke inside the furnace with the oxygen in the air admitted with the pure sulphur dioxide gas.

Having thus described my invention, I claim:—

1. In the art of producing sulphur from sulphur dioxide gas, the process which consists in liquefying the gas, vaporizing the liquefied gas thereby supplying a refrigerant agent, subjecting air to the action of said refrigerant agent, mixing the refrigerated air with the evaporated sulphur dioxide gas and subjecting the mixture to a reducing action.

2. In the art of producing sulphur from liquid sulphur dioxide, the process which consists in vaporizing the liquid sulphur dioxide incidentally forming a refrigerant, subjecting air to the action of said refrigerant thereby to reduce the moisture contents of the air, mixing the refrigerated air with the vaporized sulphur dioxide and subjecting the mixture to the action of a reducing agent.

3. In the art of producing sulphur from liquid sulphur dioxide, the process which consists in vaporizing the liquid, subjecting air to the action of a refrigerant agent, mixing the refrigerated air with the vaporized sulphur dioxide gas and reducing the mixture.

4. In the art of forming sulphur from liquefied de-hydrated sulphur dioxide, the process which consists in volatilizing the liquefied sulphur dioxide to form pure sulphur dioxide gas substantially free of air, mixing the volatilized sulphur dioxide with atmospheric air in regulated quantities and subjecting the mixture to a reducing action.

5. In the art of forming sulphur from liquefied de-hydrated sulphur dioxide, the process which consists in volatilizing the liquefied sulphur dioxide to form pure sulphur dioxide gas thereby forming a sulphur dioxide gas having a low moisture content, mixing said sulphur dioxide gas with atmospheric air in regulated quantities, subjecting the mixture of sulphur dioxide and air to a reducing action and separating the resulting sulphur from the remaining gases.

6. In the art of forming sulphur from concentrated, dry sulphur dioxide gas, the process which consists in mixing air having a known vapor content with the dry gas in regulated proportions to control the amount of water present in the mixture, preheating the mixture, subjecting the preheated mixture to the action of incandescent carbon, utilizing the heat produced to supply the necessary heat to give the preheating step a desired temperature and at the same time to cool the gases delivered from the incandescent carbon-reaction-step and finally permitting the sulphur to settle from the cooled gases.

7. In the art of reducing sulphur from a mixture of gases containing sulphur dioxide, the process which includes the steps of separating the sulphur dioxide as a de-hydrated liquefied gas to purify the same, vaporizing the liquid sulphur dioxide to form a cold sulphur dioxide gas having a low moisture content and subjecting the cold vaporized gas to a reducing action in the presence of air substantially free of water.

8. In the art of reducing sulphur from a mixture of gases containing sulphur dioxide, the process which includes the steps of de-hydrating the sulphur dioxide present to remove any water, adding substantially dry air to the sulphur dioxide to form a mixture of sulphur dioxide and air and subjecting the mixture to a reducing action substantially free of the presence of water.

9. In the art of producing sulphur from gases containing sulphur dioxide gas, the process which consists first in drying the sulphur dioxide gas, and then subjecting a regulated amount of the dry, sulphur dioxide gas, together with a regulated amount of atmospheric air which has a low vapor content to a reducing action.

Signed at Tacoma, in the county of Pierce and State of Washington this fifth day of July, A. D. 1918.

GUY C. HOWARD.